Aug. 23, 1938. J. C. COLEMAN 2,127,858
AUTOMOBILE EXTRACTOR
Filed Aug. 18, 1936 2 Sheets-Sheet 1
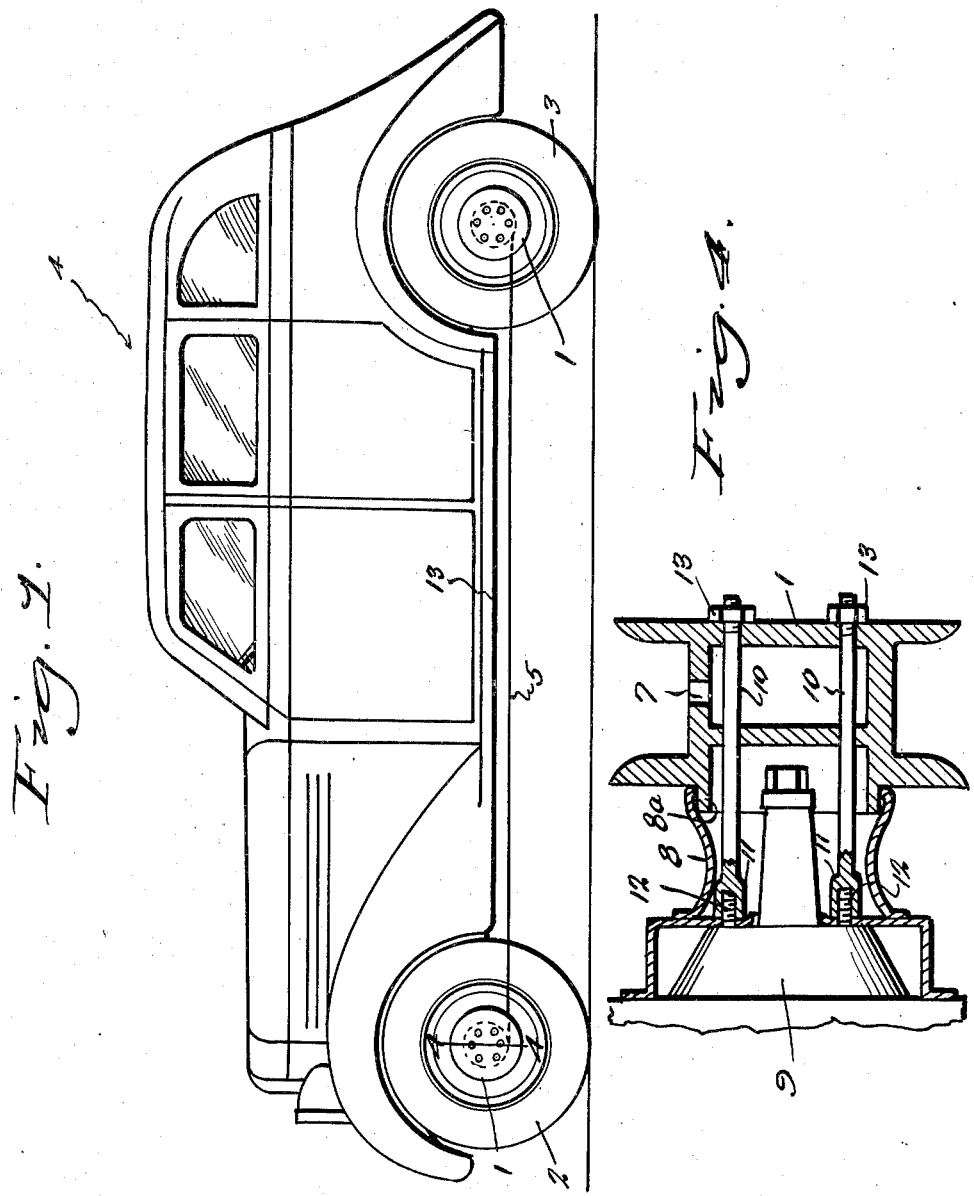
Inventor
James C. Coleman
By Clarence A. O'Brien
Hyman Berman
Attorneys Aug. 23, 1938.　　　J. C. COLEMAN　　　2,127,858
AUTOMOBILE EXTRACTOR
Filed Aug. 18, 1936　　　2 Sheets-Sheet 2
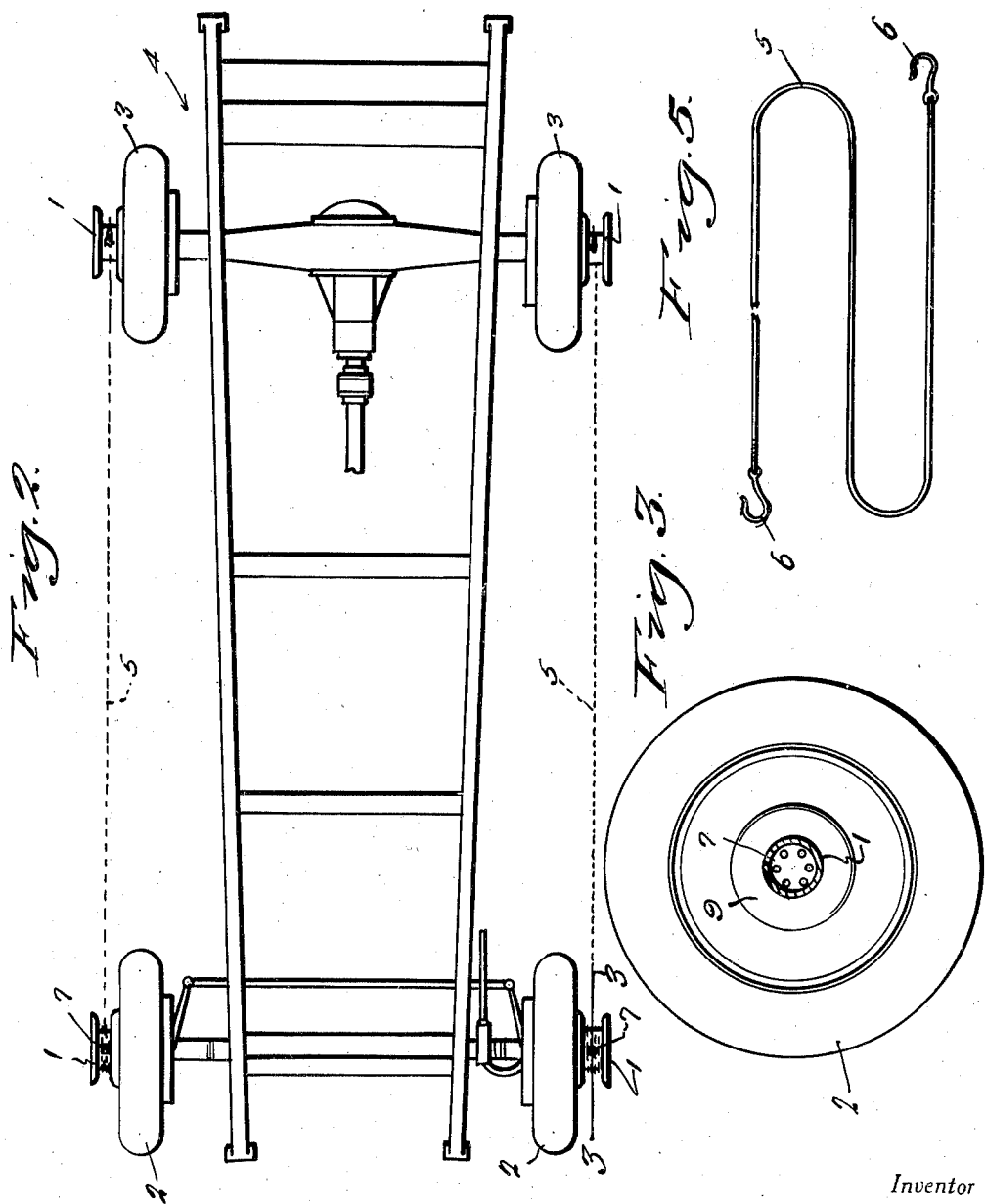
Inventor
James C. Coleman
By Clarence A. O'Brien
Hyman Berman
Attorneys Patented Aug. 23, 1938

2,127,858

UNITED STATES PATENT OFFICE 2,127,858

AUTOMOBILE EXTRACTOR

James C. Coleman, Magnet, Manitoba, Canada

Application August 18, 1936, Serial No. 96,676

1 Claim. (Cl. 242—95)

The present invention relates to new and useful improvements in automobile extractors and has for its primary object to provide apparatus for connecting the front wheels of a vehicle to the rear wheels of said vehicle for actuation thereby, thus greatly facilitating the extracting of the automobile should it become mired.

Another very important object of the invention is to provide a vehicle extracting apparatus of the aforementioned character which, in addition to driving the front wheels from the rear wheels, will prevent said rear wheels from spinning and digging themselves deeper into the mud, as frequently occurs.

Other objects of the invention are to provide an automobile extracting apparatus of the aforementioned character which will be comparatively simple in construction, strong, durable, highly efficient and reliable in use, compact, light and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of an automobile equipped with the extracting means constituting the present invention.

Figure 2 is a top plan view of the chassis of the vehicle, showing the present invention installed on the wheels thereof.

Figure 3 is a vertical sectional view, taken substantially on the line 3—3 of Figure 2.

Figure 4 is a vertical sectional view, taken substantially on the line 4—4 of Figure 1.

Figure 5 is a detail view of the cable.

Referring now to the drawings in detail, it will be seen that the embodiment of the invention which has been illustrated comprises flanged metallic drums 1 which are removably mounted on the hub portions of the front and rear wheels 2 and 3, respectively, of an automobile which is designated generally by the reference numeral 4. The drums 1 are preferably of the same size and said drums are interchangeable on the wheels. The reference numeral 5 designates a steel cable, one of which is mounted on each of the front wheel drums 1. Hooks 6 are provided on the ends of the cables 5 for engagement in openings 7 which are provided therefor in the drums 1 for detachably connecting said cables thereto.

In the embodiment shown, drum-like spacers 8 (see Figure 4) are provided between the drums 1 and the hub portions 9 of the wheels 2 and 3. Bolts 10 clamp the drums 1 in position on the wheel hubs with the spacers 8 therebetween, said bolts including threaded sockets 11 on their inner ends which are threaded onto the usual studs 12 which, together with nuts, are usually provided for securing the wheel in position. In other words, the sockets 11 constitute wheel securing nuts in lieu of the usual nuts on the studs 12. Securing nuts 13 for the drums 1 are threaded on the outer end portions of the bolts 10. Each spacer 8 is centered axially of its related drum 1 by means of an annular concentric flange 8a on the rear of said drum over which the outer edge of said spacer is fitted.

In use, one end of the cables 5 is connected to the front wheel drums 1 and said cables are then wound thereon. The other ends of the cables 5 are then hooked to the rear wheel drums 1. It will be observed that the drums 1 are of sufficient diameter to permit the cables 5 to pass freely beneath the running boards 13 of the vehicle. Now, when the rear wheels 3 of the automobile turn the cables 5 will be wound on the rear drums 1 from the front drums, thus positively driving the front wheels 2. If desired, the drums 1 may be left on the wheels, it only being necessary to remove the cables 5. Also, the drums 1 may be permanently built on the wheels of new automobiles.

It is believed that the many advantages of an automobile extractor constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:—

A device of the class described for attachment to a wheel having a hub and threaded studs extending from said hub, said device comprising a cylindrical drum having a closed front end and an intermediate internal web extending transversely thereof, means for securing said drum to said hub comprising rods extending through said end and web and having rear end sockets threaded on to said studs, nuts threaded on to the outer ends of said rods, respectively, and a cylindrical spacer intermediate the hub and drum clamped therebetween, said drum having a concentric annular flange on the rear side thereof over which the front edge of said spacer is fitted to axially align the spacer with the drum and hub.

JAMES C. COLEMAN.